United States Patent
Kim et al.

(10) Patent No.: US 11,463,121 B2
(45) Date of Patent: Oct. 4, 2022

(54) COMMUNICATION APPARATUS, VEHICLE, AND CONTROL METHOD THEREOF

(71) Applicants: HYUNDAI MOTOR COMPANY, Seoul (KR); KIA CORPORATION, Seoul (KR)

(72) Inventors: Dongjin Kim, Seoul (KR); Beom Shik Kim, Seoul (KR); Unhwan Seol, Incheon (KR); Kwangwoo Ryu, Incheon (KR); Jang Soon Han, Seoul (KR); Jaekyu Yu, Hwaseong-si (KR); Ohyun Kwon, Hwaseong-si (KR); Jihoon Sung, Seoul (KR); Jisoo Baek, Gwangmyeong-si (KR); Byoung Hyun Lee, Yongin-si (KR); Jungnam Bae, Seoul (KR); Jiwoon Lee, Hwaseong-si (KR); Eon Du Hwang, Seoul (KR); Hyeon Je Son, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/388,648

(22) Filed: Jul. 29, 2021

(65) Prior Publication Data

US 2022/0052724 A1    Feb. 17, 2022

(30) Foreign Application Priority Data

Aug. 11, 2020  (KR) .................. 10-2020-0100580

(51) Int. Cl.
*H04B 1/401*  (2015.01)
*H04B 1/3822*  (2015.01)
(Continued)

(52) U.S. Cl.
CPC ............ *H04B 1/401* (2013.01); *H04B 1/3822* (2013.01); *H04B 7/0602* (2013.01); *H04B 7/10* (2013.01); *H04W 4/40* (2018.02)

(58) Field of Classification Search
CPC ...................................................... H04B 1/401
See application file for complete search history.

(56) References Cited

U.S. PATENT DOCUMENTS

| 5,488,360 | A | * | 1/1996 | Ray | .............. | G07B 15/063 |
|---|---|---|---|---|---|---|
| | | | | | | 340/928 |
| 6,005,527 | A | * | 12/1999 | Gomez | .............. | H01Q 1/1271 |
| | | | | | | 343/711 |
| 6,184,828 | B1 | * | 2/2001 | Shoki | .............. | H01Q 3/26 |
| | | | | | | 342/372 |

FOREIGN PATENT DOCUMENTS

KR   20020035954 A  *  5/2002  ........... H01Q 21/061

OTHER PUBLICATIONS

Chao Gu, et al. 'Compact Smart Antenna With Electronic Beam-Switching and Reconfiguable Polarizations' IEEE Transactions on Antennas and Propagation, vol. 63, No. 12, Dec. 2015 (10 pages).

* cited by examiner

*Primary Examiner* — Hsinchun Liao
(74) *Attorney, Agent, or Firm* — Lempia Summerfield Katz LLC (57) ABSTRACT

A vehicle includes: a location identification device to identify a location of the vehicle; a first antenna including an antenna body, a first feeding line connected to the antenna body, and a second feeding line including a phase delay device connected to the antenna body; a first wireless transceiver connected to the first antenna to provide a communication signal to the first antenna through the first feeding line or the second feeding line; and a controller. The controller is configured to control the first wireless trans-
(Continued)

ceiver to provide a communication signal to the first antenna through the first feeding line in a first communication mode, control the first wireless transceiver to provide a communication signal to the first antenna through the first feeding line and the second feeding line in a second communication mode, and switch to the second communication mode if the vehicle approaches a toll booth while operating in the first communication mode.

20 Claims, 8 Drawing Sheets

(51) Int. Cl.
  *H04B 7/06* (2006.01)
  *H04B 7/10* (2017.01)
  *H04W 4/40* (2018.01)

COMMUNICATION APPARATUS, VEHICLE, AND CONTROL METHOD THEREOF

CROSS-REFERENCE TO RELATED APPLICATION

This application claims the benefit of priority to Korean Patent Application No. 10-2020-0100580, filed on Aug. 11, 2020, in the Korean Intellectual Property Office, the disclosure of which is incorporated herein by reference.

BACKGROUND

1. Technical Field

The disclosure relates to an antenna device and a vehicle including the same, and more particularly, to a communication apparatus capable of receiving a plurality of polarizations, a vehicle, and a control method thereof.

2. Description of the Related Art

In general, a vehicle refers to a means of transportation that travels on a road or track using fossil fuel, electricity, or the like as a power source.

In recent years, more than just transporting goods and personnel, vehicles generally include audio and video devices so that a driver may listen to music and watch videos while driving. Vehicles are also widely equipped with a navigation device that displays a route to a location where a driver desires to travel.

In recent years, the need for a vehicle to communicate with an external device (another vehicle, traffic infrastructure, or communication infrastructure) is increasing. For example, a vehicle may perform vehicle-to-vehicle communication (V2V Communication) with other vehicles, communication with traffic infrastructure such as traffic lights (Vehicle to Infra, V2I Communication), or communication with a communication infrastructure such as a base station. In addition, the vehicle may perform communication for paying road usage fees at a toll booth or the like.

In this way, in a vehicle communicating with various external devices, a plurality of antennas are separately mounted according to a communication target and a communication purpose. As a result, the number of antennas increases, but it is difficult to mount many antennas in a limited space of a vehicle.

SUMMARY

Therefore, it is an aspect of the present disclosure to provide a communication apparatus capable of transmitting and receiving a plurality of polarizations having the same or similar frequencies, a vehicle, and a control method thereof.

In accordance with one aspect of the present disclosure, a communication apparatus mounted a vehicle includes: a first antenna; a first wireless transceiver electrically connected to the first antenna to provide a communication signal to the first antenna through at least one of a first feeding line and a second feeding line; and a controller. The controller is configured to control the first wireless transceiver to provide a communication signal to the first antenna through the first feeding line in a first communication mode. The controller is also configured to control the first wireless transceiver to provide a communication signal to the first antenna through both the first feeding line and the second feeding line in a second communication mode. The communication signal passing through the second feeding line has a phase delay of 90 degrees than the communication signal passing through the first feeding line.

The first antenna may be configured to emit a linearly polarized wave in response to being provided with a communication signal through the first feeding line. The first antenna may also be configured to emit a circularly polarized wave in response to being provided with a communication signal through both the first feeding line and the second feeding line.

The vehicle may further include a location identification device configured to identify a location of the vehicle. The controller may be configured to control the wireless transceiver so that the first antenna emits the linearly polarized wave in the first communication mode. The controller may also be configured to control the wireless transceiver so that the first antenna emits the circularly polarized wave in the second communication mode if it is identified that the vehicle is approaching a predetermined location based on the location of the vehicle.

The first wireless transceiver may include: a first communication processor configured to output a communication signal; a split circuit configured to separate the communication signal into two communication signals having the same power; a first switch configured to connect the first communication processor to any one of the split circuit and the first feeding line; a second switch configured to connect or block an output of the split circuit to the first feeding line; and a third switch configured to connect or block the output of the split circuit to the second feeding line.

The controller may be configured to control the wireless transceiver to connect the first communication processor to the first feeding line and block a connection between the output of the split circuit and the first and second feeding lines in the first communication mode. The controller may also be configured to control the wireless transceiver to connect the first communication processor to the split circuit and connect the output of the split circuit to the first and second feeding lines in the second communication mode.

The communication apparatus may further include a second antenna and a second wireless transceiver electrically connected to the second antenna. The controller may be configured to control the second wireless transceiver to provide a communication signal to the second antenna.

The second wireless transceiver may include: a second communication processor configured to output a communication signal; an amplifier configured to amplify the communication signal; a fourth switch configured to connect the second communication processor to any one of the amplifier and the second antenna; and a fifth switch configured to connect the second antenna to any one of the amplifier and the second communication processor.

The controller may be configured to control the second wireless transceiver to directly connect the second communication processor with the second antenna in the first communication mode. The controller may also be configured to control the second wireless transceiver to connect the second communication processor to the second antenna through the amplifier in the second communication mode.

The controller may be configured to communicate using a spatial diversity by the first antenna and the second antenna in the first communication mode.

In accordance with one aspect of the present disclosure, a vehicle includes a location identification device configured to identify a location of the vehicle. The vehicle also includes a first antenna including an antenna body, a first feeding line connected to the antenna body, and a second feeding line including a phase delay device connected to the antenna body. The vehicle also includes a first wireless transceiver electrically connected to the first antenna to provide a communication signal to the first antenna through at least one of the first feeding line and the second feeding line. The vehicle also includes a controller configured to control the first wireless transceiver to provide a communication signal to the first antenna through the first feeding line in a first communication mode. The controller is also configured to control the first wireless transceiver to provide a communication signal to the first antenna through both the first feeding line and the second feeding line in a second communication mode. The controller is also configured to switch to the second communication mode if the vehicle approaches a toll booth while operating in the first communication mode.

The first antenna may be configured to emit a linearly polarized wave in response to being provided with a communication signal through the first feeding line. The first antenna may also be configured to emit a circularly polarized wave in response to being provided with a communication signal through both the first feeding line and the second feeding line.

The first wireless transceiver may include: a first communication processor configured to output a communication signal; a split circuit configured to separate the communication signal into two communication signals having the same power; a first switch configured to connect the first communication processor to any one of the split circuit and the first feeding line; a second switch configured to connect or block an output of the split circuit to the first feeding line; and a third switch configured to connect or block the output of the split circuit to the second feeding line.

The controller may be configured to control the wireless transceiver to connect the first communication processor to the first feeding line and block a connection between the output of the split circuit and the first and second feeding lines in the first communication mode. The controller may also be configured to control the wireless transceiver to connect the first communication processor to the split circuit and connect the output of the split circuit to the first and second feeding lines in the second communication mode.

The vehicle may further include a second antenna and a second wireless transceiver electrically connected to the second antenna. The controller may be configured to control the second wireless transceiver to provide a communication signal to the second antenna.

The second wireless transceiver may include: a second communication processor configured to output a communication signal; an amplifier configured to amplify the communication signal; a fourth switch configured to connect the second communication processor to any one of the amplifier and the second antenna; and a fifth switch configured to connect the second antenna to any one of the amplifier and the second communication processor.

The controller may be configured to control the second wireless transceiver to directly connect the second communication processor with the second antenna in the first communication mode. The controller may also be configured to control the second wireless transceiver to connect the second communication processor to the second antenna through the amplifier in the second communication mode.

The controller may be configured to communicate using a spatial diversity by the first antenna and the second antenna in the first communication mode.

In accordance with one aspect of the present disclosure, a control method of a vehicle including a first antenna and a second antenna includes communicating with another vehicle by emitting a linearly polarized wave through the first antenna and the second antenna in a first communication mode. The control method also includes switching from the first communication mode to a second communication mode in response to the vehicle approaching a predetermined location. The control method also includes communicating with another device by emitting a circularly polarized wave through the first antenna and communicating with the another vehicle by emitting a linearly polarized wave through the second antenna in the second communication mode.

The emitting the linearly polarized wave through the first antenna in the first communication mode may include supplying a first communication signal to the first antenna. The emitting the circularly polarized wave through the first antenna in the second communication mode may include supplying the first communication signal and a second communication signal with a phase delay of 90 degrees from the first communication signal to the first antenna.

The emitting the linearly polarized wave through the second antenna in the first communication mode may include supplying a third communication signal to the second antenna. The emitting the linearly polarized wave through the second antenna in the second communication mode may include supplying a fourth communication signal acquired by amplifying the third communication signal to the second antenna.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Hereinafter, an operation principle and embodiments of the disclosure are described with reference to the accompanying drawings. When a component, device, element, or the like of the present disclosure is described as having a purpose or performing an operation, function, or the like, the component, device, or element should be considered herein as being "configured to" meet that purpose or to perform that operation or function.

Figure 1:
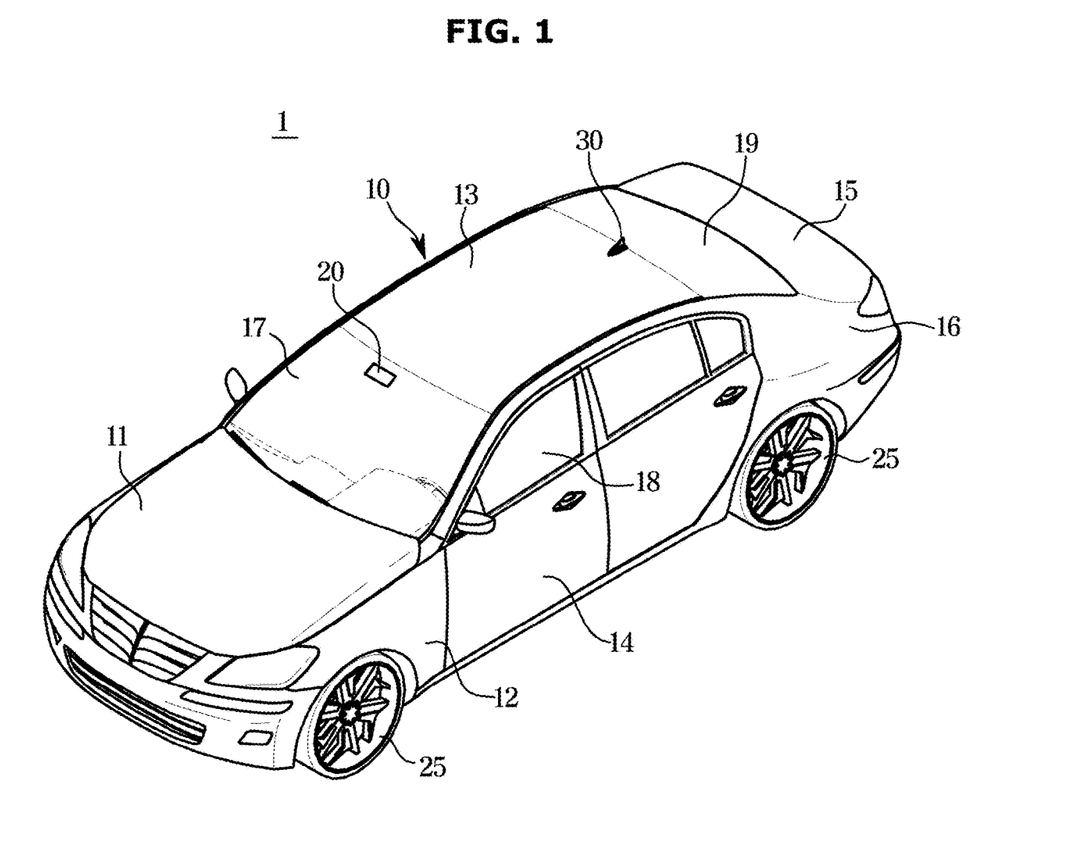
FIG. 1 illustrates a vehicle according to an embodiment.

FIG. 1 illustrates a vehicle according to an embodiment.

A vehicle 1 may include a body 10 forming an outer appearance of the vehicle 1 and accommodating a driver and/or luggage, a chassis including configuration components of the vehicle 1 other than the body, and electronic components to protect the driver and provide convenience to the driver.

Referring to FIG. 1, the vehicle 1 may include a hood 11, front fenders 12, a roof panel 13, doors 14, a trunk lid 15, quarter panels 16, and the like. In order to secure a driver's view, a front window 17 is provided on the front of the body 10, side windows 18 are provided on sides of the body 10, and rear windows 19 are provided on the rear of the body 10.

A first antenna 20 is mounted on the front window 17 and a second antenna 30 is mounted on the roof panel 13.

The second antenna 30 may communicate with various devices such as another vehicles, traffic infrastructure, and communication infrastructure communication, i.e., Vehicle to Everything Communication or "V2X Communication" (hereinafter referred to as 'V2X communication').

The first antenna 20 may perform a V2X communication together with the second antenna 30, or may perform a communication (hereinafter referred to as 'Electronic Toll Collection (ETC) communication') for paying road usage fees to a toll booth. For example, while the vehicle 1 passes through the toll booth, the first antenna 20 may wirelessly transmit and receive communication signals with the gate-type RF transmission/reception system mounted in the toll booth.

As such, the first antenna 20 may selectively perform V2X communication and ETC communication.

V2X communication and ETC communication are similar in many areas. For example, V2X communication uses a communication signal in the 5.9 GHz frequency band and ETC communication also uses a communication signal in the 5.9 GHz frequency band. In addition, V2X communication performs communication if there is a request while waiting and ETC communication also performs communication if there is a request while waiting.

However, V2X communication may use "linear polarization" while ETC communication may use "circular polarization". Linear polarization and circular polarization may be classified according to a change in the direction in which the wavelength oscillates. As is widely known, electromagnetic waves used in wireless communication have wave properties and are particularly known as a type of transverse wave that oscillates in a direction perpendicular to the direction in which the wave propagates. In nature, electromagnetic waves may oscillate in a myriad of directions perpendicular to the direction in which the wave propagates.

The polarization may represent electromagnetic waves that oscillate only in a specific direction. In addition, a linearly polarized wave may represent an electromagnetic wave in which the direction in which the wave oscillates does not change. A circularly polarized wave may represent an electromagnetic wave in which the direction in which the wave oscillates rotates. In general, it is known that if two linearly polarized waves having a phase difference of 90 degrees are mixed, a circularly polarized wave is generated.

As such, the V2X communication and the ETC communication have different types of polarization, but there are many similarities in the frequency of use.

The first antenna 20 may selectively perform the V2X communication and the ETC communication using this similarity between the V2X communication and the ETC communication.

Also, while the first antenna 20 performs V2X communication, the first antenna 20 may provide spatial diversity together with the second antenna 30. The diversity refers to a communication method that improves communication performance by using a plurality of signals transmitted through a plurality of different independent paths in order to prevent a decrease in reception performance due to fading. In particular, spatial diversity refers to a communication method that improves communication performance by using a plurality of signals received through a plurality of antennas sufficiently spaced apart.

As shown in FIG. 1, the first antenna 20 is mounted on the front window 17 of the vehicle 1 and the second antenna 30 is mounted on the rear of the roof panel 13 of the vehicle 1. Accordingly, the first antenna 20 is provided sufficiently separated from the second antenna 30 and may provide the spatial diversity together with the second antenna 30.

Figure 2:
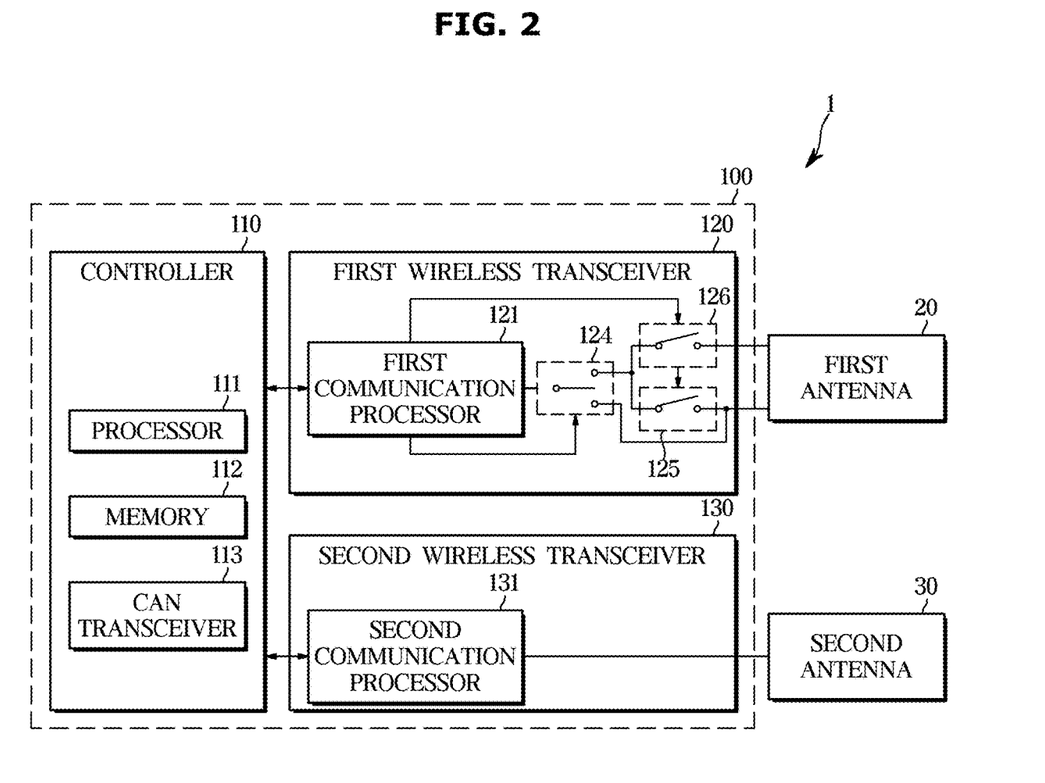
FIG. 2 illustrates an example of a communication system according to an embodiment.
Figure 3:
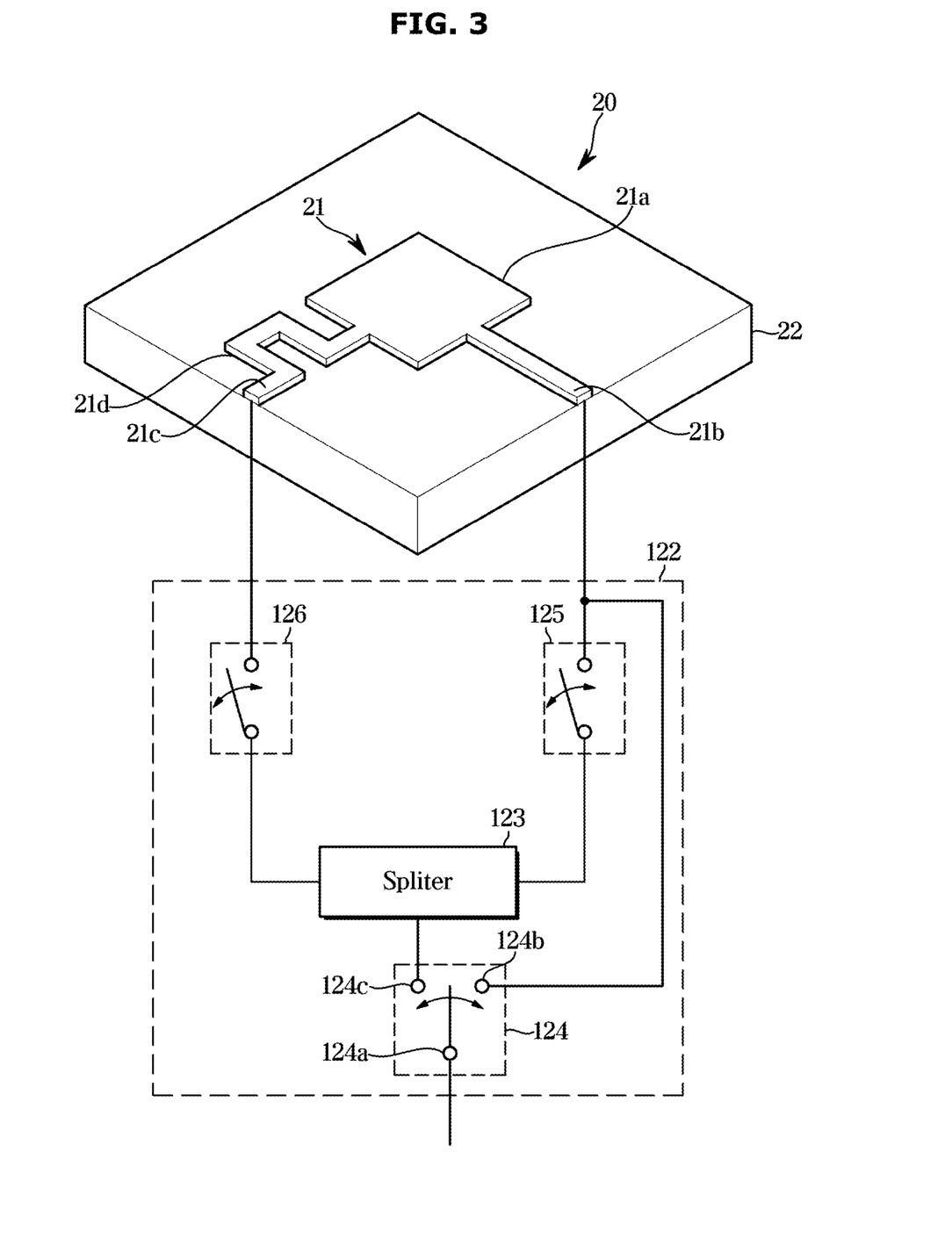
FIG. 3 illustrates an example of a first antenna included in a vehicle according to an embodiment.

FIG. 2 illustrates an example of a communication system according to an embodiment. FIG. 3 illustrates an example of a first antenna included in a vehicle according to an embodiment.

Referring to FIGS. 2 and 3, the vehicle 1 includes a first antenna 20, a second antenna 30, and a communication system 100. The communication system 100 includes a first wireless transceiver 120, a second wireless transceiver 130, and a controller 110.

The vehicle 1 may perform both V2X communication and ETC communication. For example, the vehicle 1 may perform V2X communication and ETC communication at the same time, or may selectively perform V2X communication and ETC communication.

The first antenna 20 may selectively transmit and receive the linearly polarized wave and the circularly polarized wave.

The first antenna 20 may have a shape of a patch antenna, for example, as shown in FIG. 3.

The first antenna 20 may include a dielectric layer 22 and a conductor layer 21. The dielectric layer 22 may be composed of a dielectric through which electricity does not flow and the conductor layer 21 may be composed of a conductor through which electricity flows.

Due to the AC voltage applied to the conductor layer 21 or the AC current supplied to the conductor layer 21, the dielectric layer 22 may generate an AC electric field (an electric field that changes in direction and size over time) and an AC magnetic field (a magnetic field that changes in direction and size over time). The AC electric field and the AC magnetic field may represent electromagnetic waves that form a radio signal.

The conductor layer 21 may include a substantially rectangular antenna body 21a and may include a first feeding line 21b and a second feeding line 21c for supplying signals to the antenna body 21a.

In the antenna body 21a, an electromagnetic wave due to resonance of a communication signal may be emitted into a free space, or an electromagnetic wave acquired from the free space may be converted into a communication signal by resonance. In FIG. 3, a rectangular antenna body 21a is shown, but the shape of the antenna body 21a is not limited to that shown in FIG. 3. The antenna body 21a may have various shapes according to a frequency of a communication signal and a communication purpose.

The first feeding line 21b and the second feeding line 21c each provide a communication signal to be emitted to the free space to the antenna body 21a, or transmit the radio signal received from the free space by the antenna body 21a to the first wireless transceiver 120.

In particular, the first feeding line 21b and the second feeding line 21c may provide communication signals of different phases to the antenna body 21a. As shown in FIG. 3, the second feeding line 21c may include a phase delay device 21d that delays the phase of the communication signal supplied from the first wireless transceiver 120 by approximately 90 degrees. Therefore, the first feeding line 21b transmits the communication signal supplied from the first wireless transceiver 120 to the antenna body 21a as it is. The second feeding line 21c may delay the phase of the communication signal supplied from the first wireless transceiver 120 by 90 degrees and then transmit it to the antenna body 21a.

As such, the communication signal is supplied to the antenna body 21a through the first feeding line 21b and the second feeding line 21c. The phase of the communication signal supplied through the second feeding line 21c may be delayed by approximately 90 degrees compared to the phase of the communication signal supplied through the first feeding line 21b.

Due to the above structure of the first antenna 20, in the antenna body 21a, a communication signal without a phase delay and a communication signal with a phase delay of 90 degrees are mixed and a circularly polarized wave may be emitted into a free space. In addition, in the antenna body 21a, the circularly polarized wave received from a free space may be separated into a communication signal without a phase delay and a communication signal with a phase delay of 90 degrees.

As such, the first antenna 20 may transmit and receive circularly polarized wave in order to perform ETC communication.

As described above, the first antenna 20 may also transmit and receive linearly polarized wave in order to perform V2X communication.

In order to transmit linearly polarized wave, the communication signal may be provided to the antenna body 21a through only one of the first feeding line 21b and the second feeding line 21c. For example, the communication signal may be provided to the antenna body 21a through the first feeding line 21b having a smaller signal delay. The first feeding line 21b may transmit the communication signal supplied from the first wireless transceiver 120 to the antenna body 21a and the antenna body 21a may emit linearly polarized wave by a communication signal into a free space. In addition, the linearly polarized wave collected by the antenna body 21a may be converted into a communication signal and transmitted to the first wireless transceiver 120 through the first feeding line 21b.

The second feeding line 21c may be separated or isolated from the antenna body 21a in order to minimize signal noise.

As such, a switching circuit capable of separating or isolating the second feeding line 21c from the antenna body 21a may be provided so that the first antenna 20 may provide smooth V2X communication.

The first wireless transceiver 120 includes a first communication processor 121 and a first switching circuit 122.

The first wireless transceiver 120 may modulate the communication data acquired from the controller 110 into a communication signal using a carrier signal and may transmit a communication signal to the first antenna 20 through the first switching circuit 122. In addition, the first wireless transceiver 120 may provide a communication signal to the first antenna 20 for V2X communication in the first communication mode and may provide a communication signal without a phase delay and a communication signal with a phase delay of 90 degrees to the first antenna 20 for ETC communication in the second communication mode.

The first communication processor 121 may receive communication data from the controller 110 and may modulate the communication data using a carrier signal. For example, the first communication processor 121 may modulate communication data in various modulation methods such as frequency modulation, amplitude modulation, or code modulation. The first communication processor 121 may also provide a communication signal modulated from the communication data to the first switching circuit 122. In addition, the first communication processor 121 may demodulate the communication signal received through the first antenna 20 using a carrier signal.

In addition, the first communication processor 121 may provide a mode control signal for controlling the operation of the first switching circuit 122 to the first switching circuit 122 according to the communication mode (first communication mode or second communication mode) selected by the controller 110.

The first switching circuit 122 includes a split circuit 123 and a plurality of switches 124, 125, and 126.

The first switching circuit 122 may be connected to the first feeding line 21b and the second feeding line 21c of the first antenna 20. The first switching circuit 122 connects the first communication processor 121 to the first feeding line 21b in the first communication mode and may connect the first communication processor 121 to the first feeding line 21b and the second feeding line 21c in the second communication mode.

The first switching circuit 122 includes a first switch 124, a second switch 125, a third switch 126, and a split circuit 123 as shown in FIG. 3.

The first switch 124 may be a three-contact switch including one input terminal 124a and two output terminals 124b and 124c. The input terminal 124a of the first switch 124 may be connected to the first communication processor 121 and the first output terminal 124b may be connected to the first feeding line 21b. Also, the second output terminal 124c may be connected to the split circuit 123.

The first switch 124 may output a communication signal input through the first input terminal 124a to the first output terminal 124b or to the second output terminal 124c according to the control of the first communication processor 121.

The split circuit 123 may divide an input communication signal into two identical communication signals. In other words, the communication signal may be divided into two communication signals having half the power of the original communication signal by the split circuit 123.

The second switch 125 may be provided between the split circuit 123 and the first feeding line 21b and may allow or block transmission of a communication signal between the split circuit 123 and the first feeding line 21b. The third switch 126 may be provided between the split circuit 123 and the second feeding line 21c and may allow or block transmission of a communication signal between the split circuit 123 and the second feeding line 21c.

The second switch 125 and the third switch 126 may be opened (turned off) or closed (turned on) at the same time according to the control of the first communication processor 121.

In the first communication mode (V2X communication), the first switch 124 connects the first communication processor 121 to the first feeding line 21b. The second switch 125 and the third switch 126 may be opened (turned off) to isolate the second feeding line 21c from the system. Since the communication signal is supplied through the first feeding line 21b, the first antenna 20 may radiate linearly polarized wave into a free space.

In the second communication mode (V2X communication and ETC communication), the first switch 124 connects the first communication processor 121 to the split circuit 123. The second switch 125 and the third switch 126 may be closed (turned on) to provide a communication signal to the first feeding line 21b and the second feeding line 21c. Since the communication signal is supplied through the first feeding line 21b and the second feeding line 21c, the first antenna 20 may radiate circularly polarized wave into a free space.

The second antenna 30 may perform V2X communication. In the first communication mode (V2X communication), the second antenna 30 may provide spatial diversity together with the first antenna 20.

The second wireless transceiver 130 includes a second communication processor 131 that modulates communication data received from the controller 110 into a communication signal using a carrier signal. The second wireless transceiver 130 may transmit the modulated communication signal to the second antenna 30. In addition, the second communication processor 131 may demodulate the communication signal received by the second antenna 30 using a carrier signal.

Even during the second communication mode in which the first antenna 20 and the first wireless transceiver 120 perform ETC communication, the second antenna 30 and the second wireless transceiver 130 may perform V2X communication.

The controller 110 is electrically connected to the first wireless transceiver 120 and the second wireless transceiver 130 and may transmit communication data for wireless communication to the first wireless transceiver 120 and the second wireless transceiver 130.

The controller 110 may select any one of a first communication mode for V2X communication and a second communication mode for ETC communication depending on the location of the vehicle 1 or the like. For example, the controller 110 may acquire the location information of the vehicle 1 from a Global Navigation Satellite System (GNSS) receiver mounted in the vehicle 1 or acquire the location information of the vehicle 1 from a navigation device mounted in the vehicle 1. The controller 110 may identify whether the vehicle 1 approaches a toll booth for paying road usage fees based on the location of the vehicle 1. For example, the controller 110 may store the location of the toll booth in advance and may identify whether the vehicle 1 approaches the toll booth based on a change in the distance between the vehicle 1 and the toll booth.

The controller 110 may basically operate in a first communication mode for V2X communication and may switch to a second communication mode for ETC communication in response to the vehicle 1 approaching the toll booth. In addition, while operating in the second communication mode, the controller 110 may switch to the first communication mode for V2X communication in response to the vehicle 1 moving away from the toll booth.

The controller 110 may select any one of a first communication mode and a second communication mode for ETC communication based on whether or not to receive a trigger signal for payment of the road usage fee. The controller 110 may receive a trigger signal (or a call signal) transmitted from the toll booth while approaching the toll booth and may switch from the first communication mode to the second communication mode in response to the trigger signal. In addition, if reception of the trigger signal is stopped while operating in the second communication mode, the controller 110 may switch from the second communication mode to the first communication mode. The controller 110 may also provide a communication control signal indicating the selected communication mode to the first wireless transceiver 120.

The controller 110 may transmit communication data for V2X communication to both the first wireless transceiver 120 and the second wireless transceiver 130 during the first communication mode. The controller 110 may also transmit communication data for V2X communication to the second wireless transceiver 130 during the second communication mode and may transmit communication data for ETC communication to the first wireless transceiver 120.

The controller 110 may include a plurality of semiconductor devices, and may be variously referred to as an Electronic Control Unit (ECU). The controller 110 includes a CAN transceiver 113, a memory 112, and a processor 111. The CAN transceiver 113, the memory 112, and the processor 111 may be implemented as separate semiconductor devices, or may be implemented as a single semiconductor device. The controller 110 may include a plurality of processors and/or a plurality of memories.

The CAN transceiver 113 may receive location information of the vehicle 1 from a navigation device or a GNSS receiver through a vehicle communication network.

The memory 112 may store programs and data for communication with an external device. For example, the memory 112 may store programs and data for selecting a communication mode of the communication system 100 depending on the location of the vehicle 1.

The memory 112 may include a volatile memories, such as Static Random Access Memory (S-RAM) and Dynamic Random Access Memory (D-RAM), and a nonvolatile memory, such as Read Only Memory (ROM), Erasable Programmable Read Only Memory (EPROM), and flash memory. The memory 112 may include one semiconductor device or may include a plurality of semiconductor devices.

The processor 111 may select a communication mode of the communication system 100 according to programs and data provided from the memory 112 and may transmit communication data for communication with an external device to the first wireless transceiver 120 and the second wireless transceiver 130.

The processor 111 may include an operation circuit, a memory circuit, and a control circuit. The processor 111 may include one semiconductor device or may include a plurality of semiconductors. In addition, the processor 111 may include one core or a plurality of cores in one semiconductor device. Such a processor 111 may be referred to in various ways, such as a Micro Processing Unit (MPU).

As described above, the communication system 100 of the vehicle 1 may simultaneously or selectively perform V2X communication or ETC communication according to the location of the vehicle 1. For example, the communication system 100 may basically transmit and receive radio signals with another vehicle through the first antenna 20 and the second antenna 30 for V2X communication. In response to the vehicle 1 approaching the toll booth, the communication system 100 communicates with the toll booth through the first antenna 20 for ETC communication and may transmit and receive radio signals with another vehicle through the second antenna 30 for V2X communication.

Figure 4:
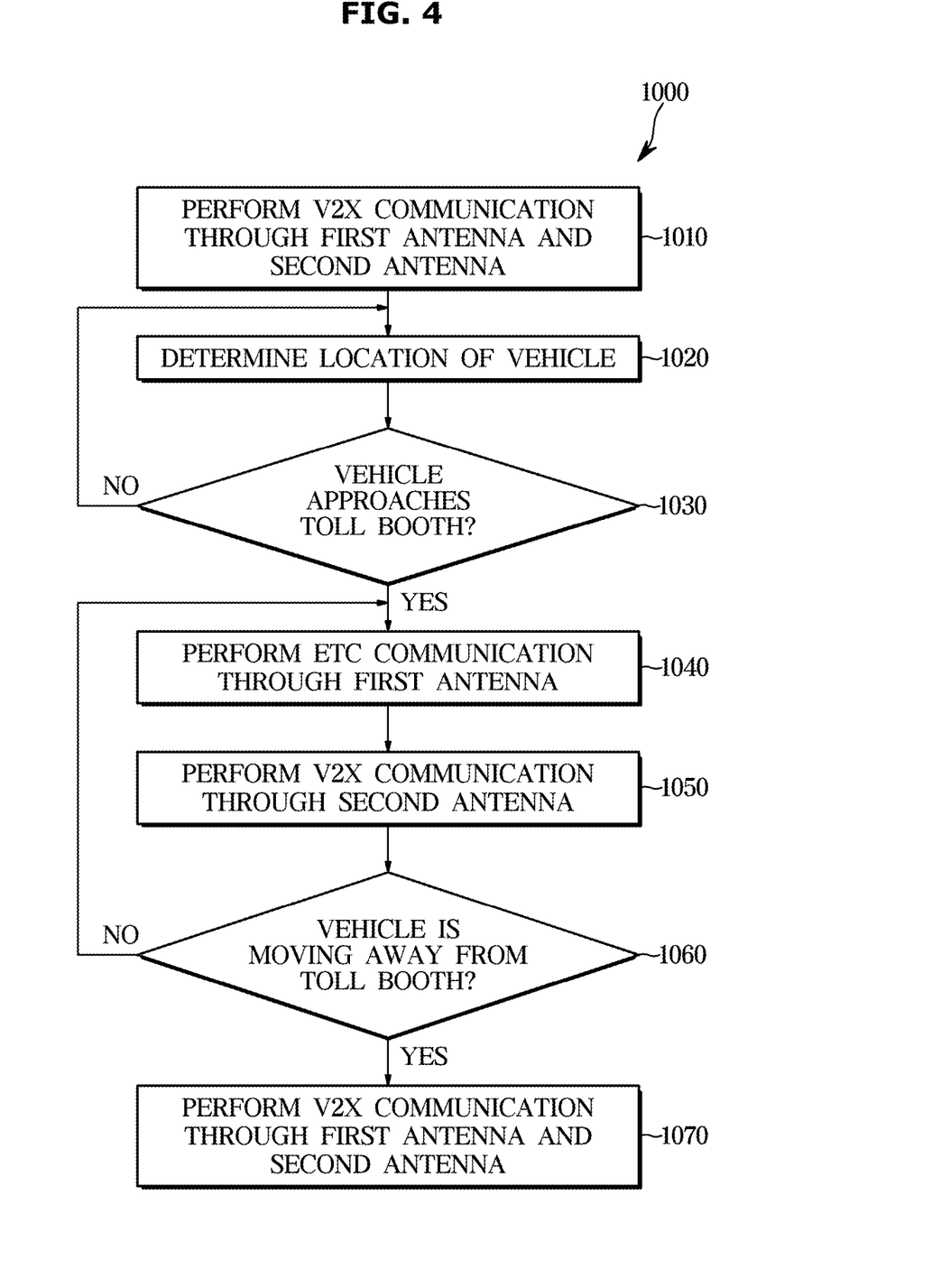
FIG. 4 illustrates an example of a communication operation of a vehicle according to an embodiment.

FIG. 4 illustrates an example of a communication operation of a vehicle according to an embodiment.

Referring to FIG. 4, the communication operation 1000 of the vehicle 1 is described.

The vehicle 1 performs V2X communication through the first antenna 20 and the second antenna 30 (1010). The communication system 100 may transmit and receive radio signals to and from other vehicles, communication infrastructure, or traffic infrastructure through the first antenna 20 and the second antenna 30. In other words, the communication system 100 operates in the first communication mode. In the first communication mode, the communication system 100 controls the first switch 124 to connect the first communication processor 121 with the first feeding line 21b of the first antenna 20 and may open (turn off) the second switch 125 and the third switch 126. In the first communication mode, the first antenna 20 may communicate with an external device through linear polarization.

The vehicle 1 determines the location (1020). The communication system 100 may acquire information on the location of the vehicle 1 from a GNSS receiver or a navigation device mounted in the vehicle 1 and identify the location of the vehicle 1.

The vehicle 1 determines whether to approach the toll booth (1030). The communication system 100 may determine whether or not the vehicle 1 approaches the toll booth for paying road usage fees based on the location of the vehicle 1.

If the vehicle 1 does not approach the toll booth (NO in 1030), the communication system 100 continues V2X communication through the first antenna 20 and the second antenna 30 and continues to monitor the location of the vehicle 1.

If it is determined that the vehicle 1 approaches the toll booth (YES in 1030), vehicle 1 performs ETC communication through the first antenna 20 (1040) and performs V2X communication through the second antenna 30 (1050). If it is determined that the vehicle 1 approaches the toll booth, the communication system 100 may switch from the first communication mode to the second communication mode and wirelessly communicate with the toll booth according to the ETC communication method. The communication system 100 may perform ETC communication through the first antenna 20 and V2X communication through the second antenna 30. In the second communication mode, the communication system 100 controls the first switch 124 to connect the first communication processor 121 with the split circuit 123 and may close (turn on) the second switch 125 and the third switch 126. In the second communication mode, the first antenna 20 may communicate with an external device through circularly polarized wave.

The vehicle 1 determines whether it is moving away from the toll booth (1060). The communication system 100 may determine whether the vehicle 1 is moved away from the toll booth based on the change in the location of the vehicle 1.

If the vehicle 1 is not far from the toll booth (NO in 1060), the communication system 100 may continue ETC communication through the first antenna 20 and V2X communication through the second antenna 30.

If it is determined that the vehicle is moving away from the toll booth (YES in 1060), the vehicle 1 performs V2X communication through the first antenna 20 and the second antenna 30 (1070).

If it is determined that the vehicle 1 is moving away from the toll booth, the communication system 100 may return to the first communication mode from the second communication mode. The communication system 100 may perform V2X communication through the first antenna 20 and the second antenna 30.

As described above, the communication system 100 may communicate in different ways according to the location of the vehicle 1 using one antenna. The communication system 100 may provide a signal to the first antenna 20 so that the first antenna 20 transmits and receives linearly polarized wave, or may provide a signal to the first antenna 20 so that the first antenna 20 transmits and receives circularly polarized wave.

Figure 5:
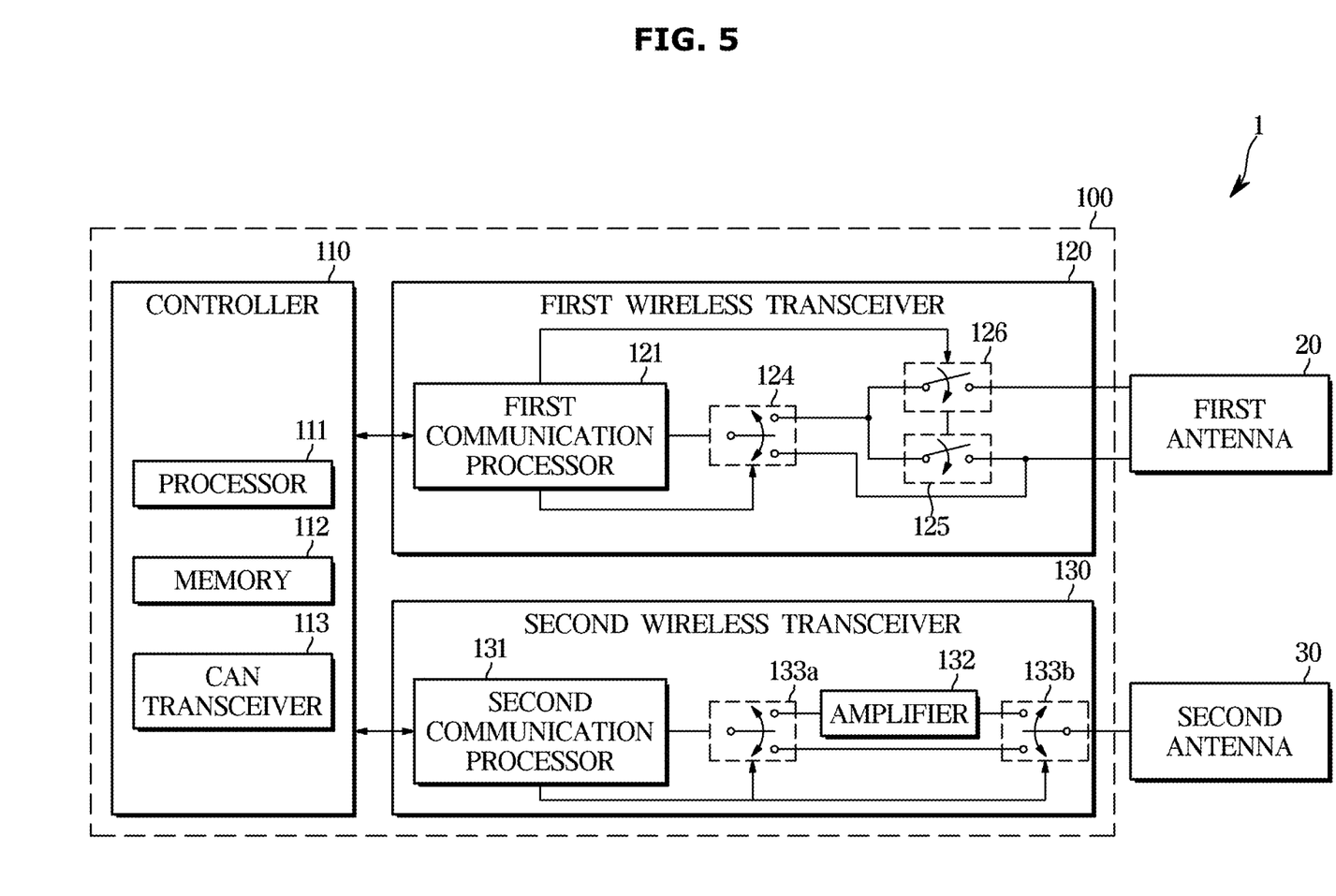
FIG. 5 illustrates an example of a communication system according to an embodiment.
Figure 6A:
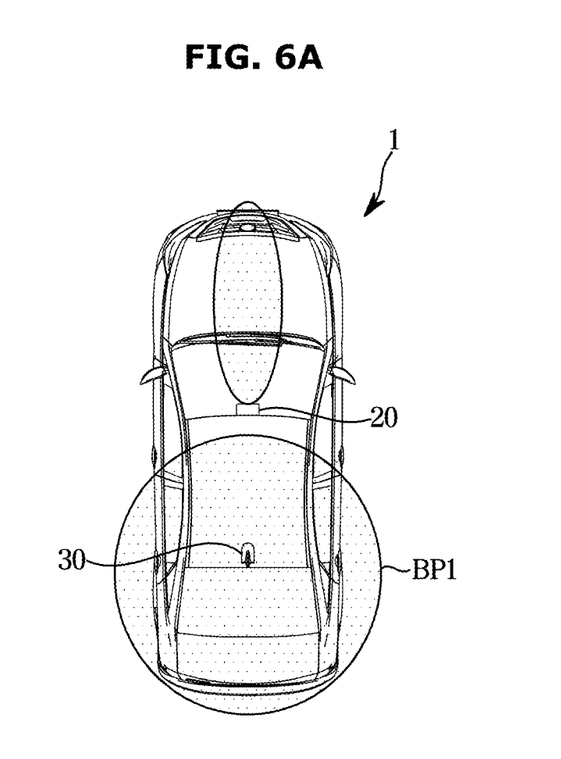
FIGS. 6A and 6B illustrate an example of a beam pattern by a communication system according to an embodiment.
Figure 6B:
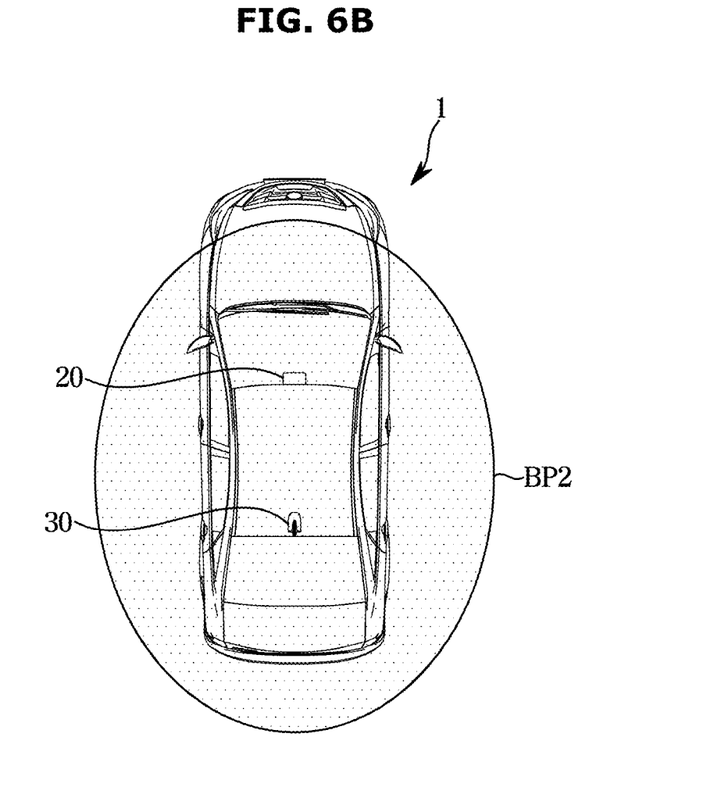

FIG. 5 illustrates an example of a communication system according to an embodiment. FIGS. 6A and 6B illustrate an example of a beam pattern by a communication system according to an embodiment.

As shown in FIG. 5, the vehicle 1 includes a first antenna 20, a second antenna 30, and a communication system 100. The communication system 100 includes a first wireless transceiver 120, a second wireless transceiver 130, and a controller 110.

The communication system 100 may operate in a first communication mode for V2X communication and a second communication mode for V2X communication and ETC communication.

In the first communication mode, the communication system 100 may communicate with an external device through the first antenna 20 and the second antenna 30. In the second communication mode, the communication system 100 may communicate with a toll booth through the first antenna 20 and communicate with an external device through the second antenna 30. As such, the first antenna 20, together with the second antenna 30 in the first communication mode, provides spatial diversity for V2X communication. On the other hand, since the first antenna 20 is used for ETC communication in the second communication mode, V2X communication performance may be degraded in the second communication mode. To prevent this, the communication system 100 may improve V2X communication performance through the second antenna 30 in the second communication mode.

The first wireless transceiver 120 includes a first communication processor 121 and a first switching circuit 122: 124, 125 and 126 as shown in FIG. 2.

The second wireless transceiver 130 includes a second communication processor 131, an amplifier 132, and a second switching circuit 133: 133a and 133b.

The amplifier 132 may amplify the transmission signal provided to the second antenna 30 from the second communication processor 131 and may amplify the received signal provided to the second communication processor 131 from the second antenna 30. In other words, the amplifier 132 may be a bidirectional amplifier.

The second switching circuit 133 may allow amplification of the communication signal by the amplifier 132 or may block amplification of the communication signal by the amplifier 132. The second switching circuit 133 includes a fourth switch 133a and a fifth switch 133b provided at both ends of the amplifier 132. Each of the fourth switch 133a and the fifth switch 133b may be a three-contact switch including one input terminal and two output terminals.

Depending on the operations of the fourth switch 133a and the fifth switch 133b, the second switching circuit 133 may cause the radio signal to pass through the amplifier 132 or bypass the amplifier 132.

The second communication processor 131 may modulate the communication data received from the controller 110 into a communication signal using a carrier signal, and may demodulate the communication signal received by the second antenna 30 using a carrier signal.

The second communication processor 131 may control the second switching circuit 133 so that the radio signal bypasses the amplifier 132 in the first communication mode. In the first communication mode, both the first antenna 20 and the second antenna 30 may perform V2X communication as shown in FIG. 6A. In particular, the second antenna 30 may provide a first beam pattern BP1 for V2X communication. In this case, the beam pattern may indicate a range in which a radio signal having a predetermined power may be received in the vicinity of the antenna.

In addition, the second communication processor 131 may control the second switching circuit 133 so that the radio signal passes through the amplifier 132 in the second communication mode. In the second communication mode, only the second antenna 30 may perform V2X communication, as shown in FIG. 6B. In particular, the second antenna 30 may provide a second beam pattern BP2 for V2X communication. In this case, the second beam pattern BP2 may cover a wider range than the first beam pattern BP1. In other words, the second antenna 30 may transmit a radio signal to a greater distance compared to the first communication mode in the second communication mode, and may provide improved communication quality.

Figure 7:
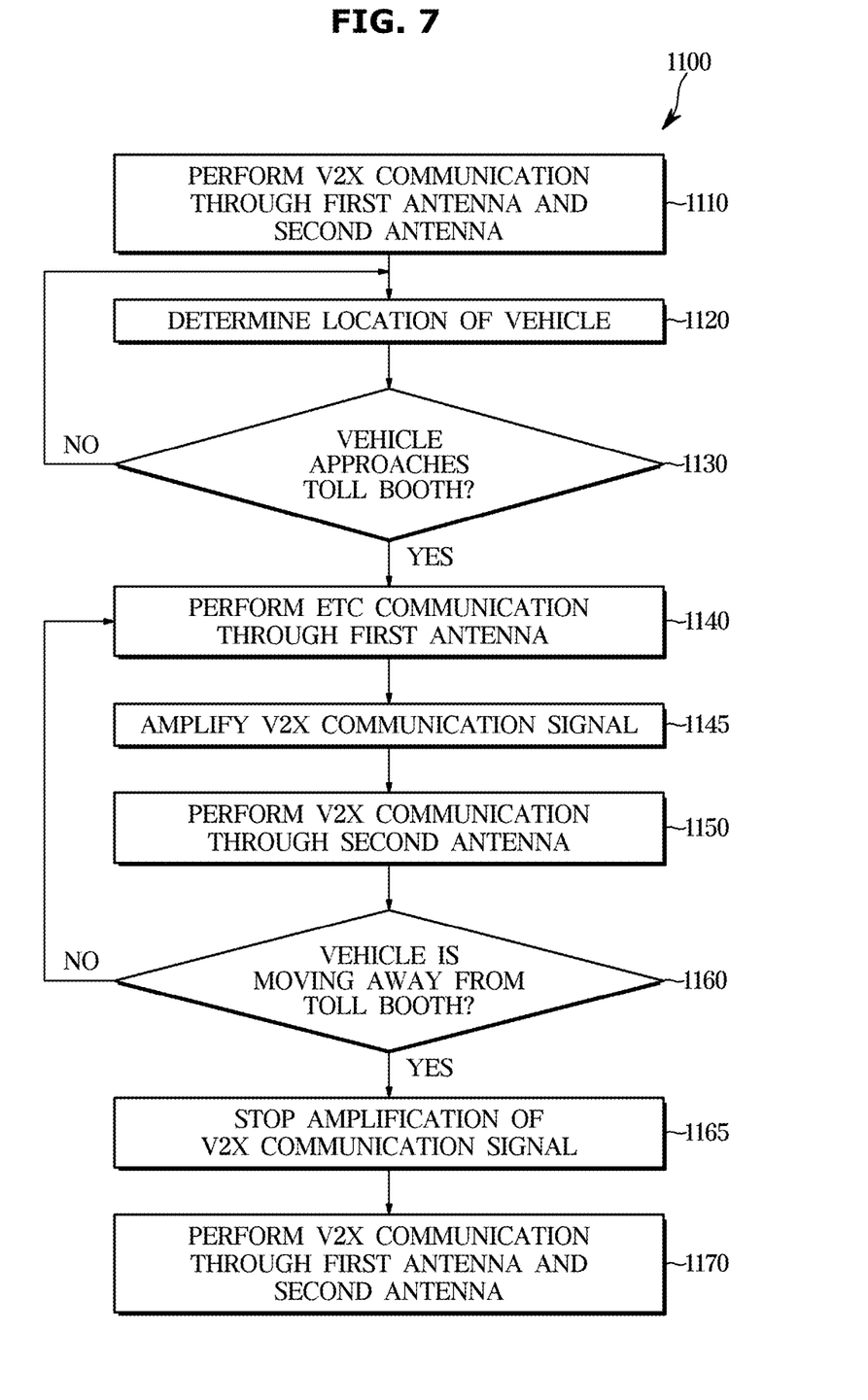
FIG. 7 illustrates an example of a communication operation of a vehicle according to an embodiment.

FIG. 7 illustrates an example of a communication operation of a vehicle according to an embodiment.

With FIG. 7, the communication operation 1100 of the vehicle 1 is described.

The vehicle 1 performs V2X communication through the first antenna 20 and the second antenna 30 (1110), determines the location (1120), and determines whether the vehicle 1 approaches a toll booth (1130). If it is determined to approach the toll booth (YES in 1130), the vehicle 1 performs ETC communication through the first antenna 20 (1140). The operations 1110, 1120, 1130, and 1140 may be the same as operations 1010, 1020, 1030, and 1040 shown in FIG. 4.

The vehicle 1 amplifies the V2X communication signal (1145) and performs V2X communication through the second antenna 30 (1150).

The controller 110 of the communication system 100 may control the second wireless transceiver 130 to amplify a V2X communication signal provided to the second antenna 30. The second wireless transceiver 130 may control the second switching circuit 133 so that the V2X communication signal passes through the amplifier 132 according to the control of the controller 110. The V2X communication signal is amplified by the amplifier 132 and V2X communication performance may be improved.

The vehicle 1 determines whether it is moving away from the toll booth (1160), stops the amplification of the V2X communication signal (1165) if it is determined that it is moving away from the toll booth (YES in 1160), and performs V2X communication through the first antenna 20 and the second antenna 30 (1170).

Operation 1160 may be the same as operation 1060 illustrated in FIG. 4.

Since a spatial diversity is provided by the first antenna 20 and the second antenna 30 when the vehicle 1 is moving away from the toll booth, sufficient communication performance may be provided without amplification of the V2X communication signal. For the above reasons, the controller 110 of the communication system 100 may control the second wireless transceiver 130 to stop amplifying the V2X communication signal provided to the second antenna 30. The second wireless transceiver 130 may control the second switching circuit 133 so that the V2X communication signal bypasses the amplifier 132 according to the control of the controller 110.

As described above, the communication system 100 of the vehicle 1 may simultaneously or selectively perform the V2X communication using the first and second antennas 20 and 30 or the ETC communication using the first antenna 20 according to the location of the vehicle 1. In order to prevent the communication performance of the V2X communication from deteriorating while performing the ETC communication using the first antenna 20, the communication system 100 may amplify the V2X communication signal.

According to an aspect of the disclosure, a communication apparatus capable of transmitting and receiving a plurality of polarizations having the same or similar frequencies, a vehicle, and a control method thereof can be provided.

As described above, the disclosed embodiments have been described with reference to the accompanying drawings. Those of ordinary skill in the art to which the present disclosure pertains should understand that the present disclosure may be practiced in a form different from the disclosed embodiments without changing the technical spirit or essential features of the present disclosure. Such a different form should fall within the scope of the claims of the present disclosure. The disclosed embodiments are illustrative and should not be construed as limiting.

What is claimed is:

1. A communication apparatus mounted a vehicle, the communication apparatus comprising:
    a first antenna;
    a first wireless transceiver electrically connected to the first antenna to provide a communication signal to the first antenna through at least one of a first feeding line and a second feeding line; and
    a controller configured to
        control the first wireless transceiver to provide a communication signal to the first antenna through the first feeding line in a first communication mode, and
        control the first wireless transceiver to provide a communication signal to the first antenna through both the first feeding line and the second feeding line in a second communication mode,
    wherein the communication signal passing through the second feeding line has a phase delay of substantially 90 degrees than the communication signal passing through the first feeding line.

2. The communication apparatus according to claim 1, wherein the first antenna is configured to:
    emit a linearly polarized wave in response to being provided with a communication signal through the first feeding line, and
    emit a circularly polarized wave in response to being provided with a communication signal through both the first feeding line and the second feeding line.

3. The communication apparatus according to claim 2, wherein the vehicle further comprises a location identification device configured to identify a location of the vehicle, and
    wherein the controller is configured to
        control the wireless transceiver so that the first antenna emits the linearly polarized wave in the first communication mode, and
        control the wireless transceiver so that the first antenna emits the circularly polarized wave in the second communication mode based on the vehicle being approaching a predetermined location based on the location of the vehicle.

4. The communication apparatus according to claim 1, wherein the first wireless transceiver comprises:
    a first communication processor configured to output a communication signal;
    a split circuit configured to separate the communication signal into two communication signals having the same power;
    a first switch configured to connect the first communication processor to any one of the split circuit and the first feeding line;
    a second switch configured to connect or block an output of the split circuit to the first feeding line; and a third switch configured to connect or block the output of the split circuit to the second feeding line.

5. The communication apparatus according to claim 4, wherein the controller is configured to:
control the wireless transceiver to connect the first communication processor to the first feeding line and block a connection between the output of the split circuit and the first and second feeding lines in the first communication mode, and
control the wireless transceiver to connect the first communication processor to the split circuit and connect the output of the split circuit to the first and second feeding lines in the second communication mode.

6. The communication apparatus according to claim 1, wherein the communication apparatus further comprises a second antenna and a second wireless transceiver electrically connected to the second antenna, and
wherein the controller is configured to control the second wireless transceiver to provide a communication signal to the second antenna.

7. The communication apparatus according to claim 6, wherein the second wireless transceiver comprises:
a second communication processor configured to output a communication signal;
an amplifier configured to amplify the communication signal;
a fourth switch configured to connect the second communication processor to any one of the amplifier and the second antenna; and
a fifth switch configured to connect the second antenna to any one of the amplifier and the second communication processor.

8. The communication apparatus according to claim 7, wherein the controller is configured to:
control the second wireless transceiver to directly connect the second communication processor with the second antenna in the first communication mode; and
control the second wireless transceiver to connect the second communication processor to the second antenna through the amplifier in the second communication mode.

9. The communication apparatus according to claim 6, wherein the controller is configured to communicate using a spatial diversity by the first antenna and the second antenna in the first communication mode.

10. A vehicle comprising:
a location identification device configured to identify a location of the vehicle;
a first antenna comprising an antenna body, a first feeding line connected to the antenna body, and a second feeding line comprising a phase delay device connected to the antenna body;
a first wireless transceiver electrically connected to the first antenna to provide a communication signal to the first antenna through at least one of the first feeding line and the second feeding line; and
a controller configured to
control the first wireless transceiver to provide a communication signal to the first antenna through the first feeding line in a first communication mode,
control the first wireless transceiver to provide a communication signal to the first antenna through both the first feeding line and the second feeding line in a second communication mode, and
switch to the second communication mode if the vehicle approaches a toll booth while operating in the first communication mode.

11. The vehicle according to claim 10, wherein the first antenna is configured to:
emit a linearly polarized wave in response to being provided with a communication signal through the first feeding line; and
emit a circularly polarized wave in response to being provided with a communication signal through both the first feeding line and the second feeding line.

12. The vehicle according to claim 10, wherein the first wireless transceiver comprises:
a first communication processor configured to output a communication signal;
a split circuit configured to separate the communication signal into two communication signals having the same power;
a first switch configured to connect the first communication processor to any one of the split circuit and the first feeding line;
a second switch configured to connect or block an output of the split circuit to the first feeding line; and
a third switch configured to connect or block the output of the split circuit to the second feeding line.

13. The vehicle according to claim 12, wherein the controller is configured to:
control the wireless transceiver to connect the first communication processor to the first feeding line and block a connection between the output of the split circuit and the first and second feeding lines in the first communication mode, and
control the wireless transceiver to connect the first communication processor to the split circuit and connect the output of the split circuit to the first and second feeding lines in the second communication mode.

14. The vehicle according to claim 10, wherein the vehicle further comprises a second antenna and a second wireless transceiver electrically connected to the second antenna, and
wherein the controller is configured to control the second wireless transceiver to provide a communication signal to the second antenna.

15. The vehicle according to claim 14, wherein the second wireless transceiver comprises:
a second communication processor configured to output a communication signal;
an amplifier configured to amplify the communication signal;
a fourth switch configured to connect the second communication processor to any one of the amplifier and the second antenna; and
a fifth switch configured to connect the second antenna to any one of the amplifier and the second communication processor.

16. The vehicle according to claim 15, wherein the controller is configured to:
control the second wireless transceiver to directly connect the second communication processor with the second antenna in the first communication mode; and
control the second wireless transceiver to connect the second communication processor to the second antenna through the amplifier in the second communication mode.

17. The vehicle according to claim 10, wherein the controller is configured to communicate using a spatial diversity by the first antenna and the second antenna in the first communication mode.

18. A control method of a vehicle comprising a first antenna and a second antenna, the control method comprising:

communicating with another vehicle by emitting a linearly polarized wave through the first antenna and the second antenna in a first communication mode;

switching from the first communication mode to a second communication mode in response to the vehicle approaching a predetermined location; and communicating with another device by emitting a circularly polarized wave through the first antenna and communicating with the another vehicle by emitting a linearly polarized wave through the second antenna in the second communication mode.

19. The control method according to claim 18, wherein the emitting of the linearly polarized wave through the first antenna in the first communication mode comprises supplying a first communication signal to the first antenna, and wherein the emitting of the circularly polarized wave through the first antenna in the second communication mode comprises supplying the first communication signal and a second communication signal with a phase delay of 90 degrees from the first communication signal to the first antenna.

20. The control method according to claim 18, wherein the emitting of the linearly polarized wave through the second antenna in the first communication mode comprises supplying a third communication signal to the second antenna, and wherein the emitting of the linearly polarized wave through the second antenna in the second communication mode comprises supplying a fourth communication signal acquired by amplifying the third communication signal to the second antenna.

* * * * *